Aug. 16, 1949.  K. PAPE  2,478,939
METHOD OF ADHESIVELY BONDING COMPONENTS OF HOSE WALLS
Filed Jan. 26, 1946

INVENTOR.
Karl Pape
BY
Williams, Rich & Morse
ATTORNEYS.

Patented Aug. 16, 1949

2,478,939

UNITED STATES PATENT OFFICE 2,478,939

METHOD OF ADHESIVELY BONDING COMPONENTS OF A HOSE WALL

Karl Pape, Dover, N. J., assignor to Resistoflex Corporation, Belleville, N. J., a corporation of New York Application January 26, 1946, Serial No. 643,732

7 Claims. (Cl. 154—8)

1

This invention relates to the adhering together of two or more layers of fibrous material forming component parts of a hose wall.

More particularly the invention provides a novel method of forming a hose wherein the partially completed hose, having at least one layer of textile fabric on its outer surface, is treated in succession by solvent for an adhesive, then coated with the adhesive in dry finely-divided form, another layer of textile fabric being formed over the thus coated surface and the hose thereafter treated to bond the two layers together by means of the adhesive.

In the manufacture of hose of various kinds it is common practice to successively braid or weave about a central conduit or a mandrel a plurality of layers of fabric which serve to provide the required wall strength. These layers should be adhered together in such a manner as not unduly to impair the flexibility of the hose.

Polyvinyl alcohol in aqueous solution has heretofore been proposed for use as an adhesive but its use in this form has not been satisfactory in many applications. The amount of polyvinyl alcohol which can be dissolved in a workable solution is limited. Textiles absorb the solution so that only a limited quantity remains on or between the contacting surfaces. The absorbed solution, on drying, produces in many applications an undesirable stiffness in the finished product. For this reason plasticizers have been added to the solution to the detriment of its adhesive properties. The solution, moreover, is difficult to handle in that it requires extra labor in cleaning equipment and is troublesome where the continuity of processing is interrupted.

In accordance with the invention the adhesive is applied directly to the work in dry form and subsequently treated to develop its adhesive qualities. Since the equipment used in practicing the method is required to handle only dry powder and solvent, no removal of unused adhesive is necessary when processing is interrupted. Great increase in the strength of the bond is produced and better flexibility is obtained than where plasticized solution is used.

The method of the invention will best be evident from the following description of the present preferred embodiment thereof as carried out in one form of suitable apparatus which will now

Figure 1:
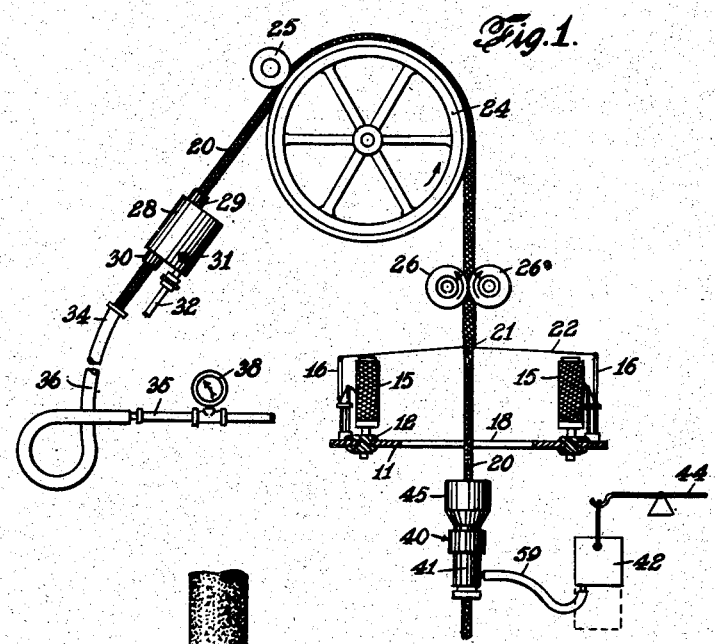
Figure 2:
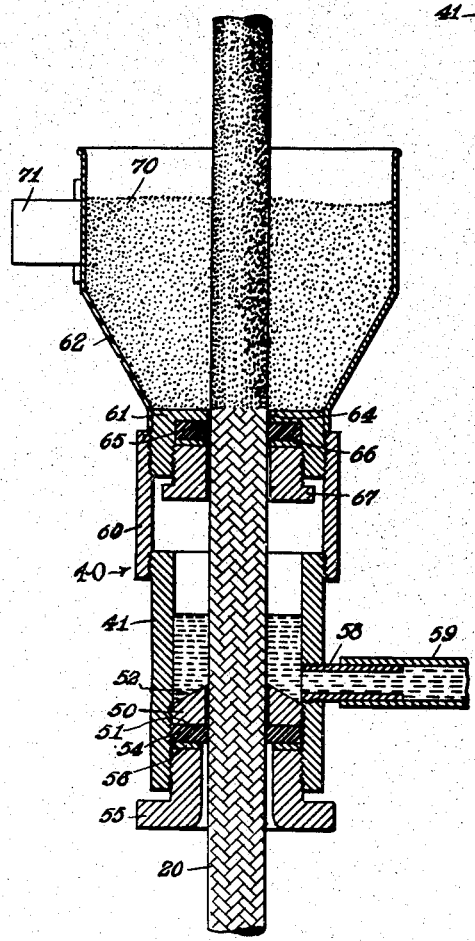

2 be described in conjunction with the drawings wherein:

Fig. 1 is a diagrammatic representation of apparatus used in the making of hose having two or more layers of textile fabric, at least one of which is a braid; and Fig. 2 is a central sectional elevation of apparatus for successively applying liquid solvent and powdered adhesive material to such hose in carrying out the invention.

Referring to Fig. 1, the drawing shows certain parts of a common type of braiding machine, including a slotted plate 11, the slots in which determine the travel of carriers 12 which are actuated in the usual manner by a gear train (not shown). Each carrier holds the usual cylindrical cross-wound spool 15 and is provided with the usual yarn tensioning device 16. The plate 11 has a central aperture 18 through which passes the tubing 20 to be covered. As is well known, the carriers, which may vary in number but of which there are usually at least 24, travel about the tubing in such manner as to weave a braid thereon at the point 21 where the yarns 22 meet the tubing. After being braided, the tubing passes over a capstan 24 against which it is pressed by a spring-actuated roller 25. Auxiliary rollers 26 may be used to assist in drawing the tubing through the braiding machine. As the tubing 20 leaves the capstan, it passes through a solvent applying device 28 comprising a chamber having an inlet 29 and an outlet 30 for the tubing, a pipe 31 for introducing solvent vapor into the chamber and another pipe 32 which serves as a drain. This device may be constructed as shown in my previous Patents 2,262,514 and 2,262,515, issued November 11, 1941, to which reference is made for a more detailed description.

To maintain the tubing 20 under an inflating pressure during the processing, to provide a firm foundation for the braid and press the layers together, one end is connected at 34 with a compressed air line 35 by means of a flexible hose 36, the applied pressure being shown by a gage 38. It will be understood that the other end of the tubing will be closed to cause the desired air pressure to build up therein and that the tubing itself at this stage is impermeable to air by virtue of a non-porous layer.

The tubing entering the braiding machine is shown as having one layer of braid forming its outer surface and a second layer of braid as being applied on top of it. It will be understood, of course, that the process can be repeated as often as may be desired to provide any number of layers of braid.

Before the tubing 20 enters the braiding mechanism, it passes through a wetting and powder-applying device 40 shown in detail in Fig. 2. In passing through the lower part 41, the tubing is wetted with water supplied from a container 42 mounted for vertical movement as, for example, on the pivoted arm 44 so that by lowering the container 42 into the position shown in dotted lines, the water contained in the lower part 41 of the device 40 can be drained off in the event the movement of the tubing 20 is stopped for reasons hereinafter explained. In the upper part 45 of the device 40, the wetted tubing is coated with a layer of powdered polyvinyl alcohol, which naturally adheres to the moist fabric, and the next layer of braid is formed at the point 21, sealing the powder between the two layers of braid.

Referring to Fig. 2, the detailed construction of the device 40 is as follows: the lower part 41 comprises a cylindrical chamber internally threaded in its lower end to receive a bottom member 50 having a flat lower surface 51 and a conical upper surface 52. The member 50 has a central aperture sufficient to permit the free passage of the tubing 20 therethrough and a water-tight seal is provided by a soft rubber gasket 54 which may be compressed against the lower surface of member 50 by a threaded annular nut 55 bearing against a metal washer 56. A pipe 58 is screwed into an aperture in the chamber 41 which is positioned below th. top of the member 50. A flexible hose 59 connects the pipe 58 with the container 42.

The solvent chamber 41 is externally threaded at its upper end to receive an internally threaded collar 60. This collar is also internally threaded at its upper end to receive a plug 61 forming the bottom of a hopper 62. The plug 61 has a central aperture 64 to permit free passage of tubing 20 and below this aperture is a second rubber washer 65, metal washer 66 and threaded annular collar 67, forming an adjustable seal to prevent the material in the hopper 62 from falling into the chamber 41 and which may be adjusted to remove excess water by exerting pressure on the tubing 20. In order to keep the loosely powdered material 70 in the hopper 62 in contact with the tubing 20 at all times, any suitable vibrating device 71 may be provided to be operated electrically or mechanically in a known manner so as to render the powder mobile and cause it to flow into contact with the tubing.

The apparatus above described is not claimed herein but in application Serial No. 735,818, filed March 19, 1947, as a division hereof.

*Operation*

Tubing having one or more layers of braid on it is pushed up through washer 54, through the water chamber and through washer 65 and the hopper 62, chamber 41 being empty at this time. Nut 55 is adjusted with the minimum pressure required to keep water from leaking out of the chamber. Nut 67 may be adjusted to give any desired pressure on the tubing. The looser its adjustment the wetter the tubing will be as it enters the hopper. Reservoir 42 is raised to permit water to flow into chamber 41 to the desired depth. A wetting agent may be added to the water if desired, where water is the solvent used. Because of the rather slow movement of tubing through a braider, it is sufficient if about an inch of water is maintained in chamber 41, the water level being adjusted by raising or lowering reservoir 42. Because it is necessary to stop braiders periodically to add yarn spools, chamber 41 should be drained by lowering the reservoir, especially where the hose liner is of polyvinyl alcohol composition, which is affected by water, to prevent excessive or non-uniform wetting of the braid or damage to the liner through the solvent action of excess water.

As tubing 20 passes upwardly through the device 40 and the braider, a layer of polyvinyl alcohol powder adheres to its moistened outer surface and a new layer of braid is applied thereover. When this composite article passes through the steaming chamber 28, the steam supplies heat and moisture through the newly applied braid and this, together with the moisture in the underlying braid, exercises a dissolving action on the polyvinyl alcohol powder which becomes strongly adherent to both layers of braid. With the method described the polyvinyl alcohol does not soak into or impregnate either layer of braid and its adhesive action is therefore limited to the adjacent surface fibers of the two layers of braid, which is the only place where adhesive serves a useful purpose in bonding the layers. As a result, the braid layers maintain most of their original pliability. At the same time, because the concentration of polyvinyl alcohol at the adhered surfaces is much greater than where polyvinyl alcohol solution is used, the strength of the bond between layers of braid is very much greater than that resulting when solution is used.

While the invention may be applied with various grades of polyvinyl alcohol, some grades have better adhesive properties and are more adaptable to the practice of the invention than others. In general the "type B" or completely saponified grades are not preferred. A "type A" polyvinyl alcohol (which designation refers to incompletely saponified grades) having a saponification number, or a blend having an average saponification number, of between about 100 and 150 and of medium viscosity, will generally be found most satisfactory. By medium viscosity is meant from about 15 to 25 centipoises measured on a 4% aqueous solution at 20° C.

The foregoing detailed descriptions of the method and apparatus are to be construed as merely illustrative and not as limitations on the invention, the scope of which is defined in the appended claims.

What is claimed is:

1. The method of bonding two layers of fabric forming part of a hose wall which comprises passing the first layer successively through water and finely divided polyvinyl alcohol to coat the surface thereof, forming the second layer over the coated surface, and then subjecting the composite to the action of a steam bath while maintaining the two layers in intimate contact.

2. In the manufacture of hose, the method of bonding together over a liner at least two covering layers of textile fabric which comprises forming a first layer of fabric on said liner, passing the covered liner successively through water and powdered polyvinyl alcohol, forming a second layer of fabric over the thus coated surface of the first layer, and thereafter subjecting the composite to an externally applied steam bath.

3. The method of claim 2 wherein the hose is maintained under an inflating pressure to press the layers together during the steaming operation.

4. The method of claim 2 wherein the powdered polyvinyl alcohol is incompletely saponified.

5. The method of making a double-braided hose having a tubular liner which comprises applying a first braided covering on said liner, passing the thus covered liner through water, drawing the wetted covered liner upwardly in contact with a body of powdered polyvinyl alcohol, braiding a second covering over the layer of powder adhering thereto, and passing the composite article thus produced through an externally applied steam bath.

6. The method of bonding two layers of fabric forming components of a hose wall which comprises passing the first layer of fabric through a bath of liquid solvent for polyvinyl alcohol adhesive so as to wet said layer, passing the wetted layer through a mass of dry finely divided polyvinyl alcohol adhesive to cause said first layer to become coated with said adhesive, forming a second layer of fabric over the thus coated surface, and thereafter applying solvent for said adhesive in vapor form through said second layer.

7. The method of making a hose having at least two layers of braid as components of its wall which comprises, forming a layer of braid, passing said layer through a bath of solvent for polyvinyl alcohol adhesive to wet said layer, drawing the wetted layer through dry finely divided polyvinyl alcohol adhesive to coat the layer therewith, forming another braid over said coated layer, and applying solvent in vapor form to the outside of the last formed braid, the layers of braid being maintained in close contact with each other until the adhesive has dried.

KARL PAPE.

REFERENCES CITED

The following references are of record in the file of this patent:

UNITED STATES PATENTS

| Number | Name | Date |
|---|---|---|
| 988,384 | Preston | Apr. 4, 1911 |
| 1,039,697 | Cobb | Oct. 1, 1912 |
| 1,697,077 | McIntosh | Jan. 1, 1929 |
| 1,923,922 | Dike | Aug. 22, 1933 |
| 2,019,709 | Kennedy | Nov. 5, 1935 |
| 2,160,371 | Schnabel | May 30, 1939 |
| 2,262,514 | Pape | Nov. 11, 1941 |
| 2,399,338 | Ford | Apr. 30, 1946 |